J. F. O'CONNOR.
RESILIENT VEHICLE WHEEL.
APPLICATION FILED JUNE 10, 1915.
1,220,534.                                    Patented Mar. 27, 1917.
                                                      2 SHEETS—SHEET 1.
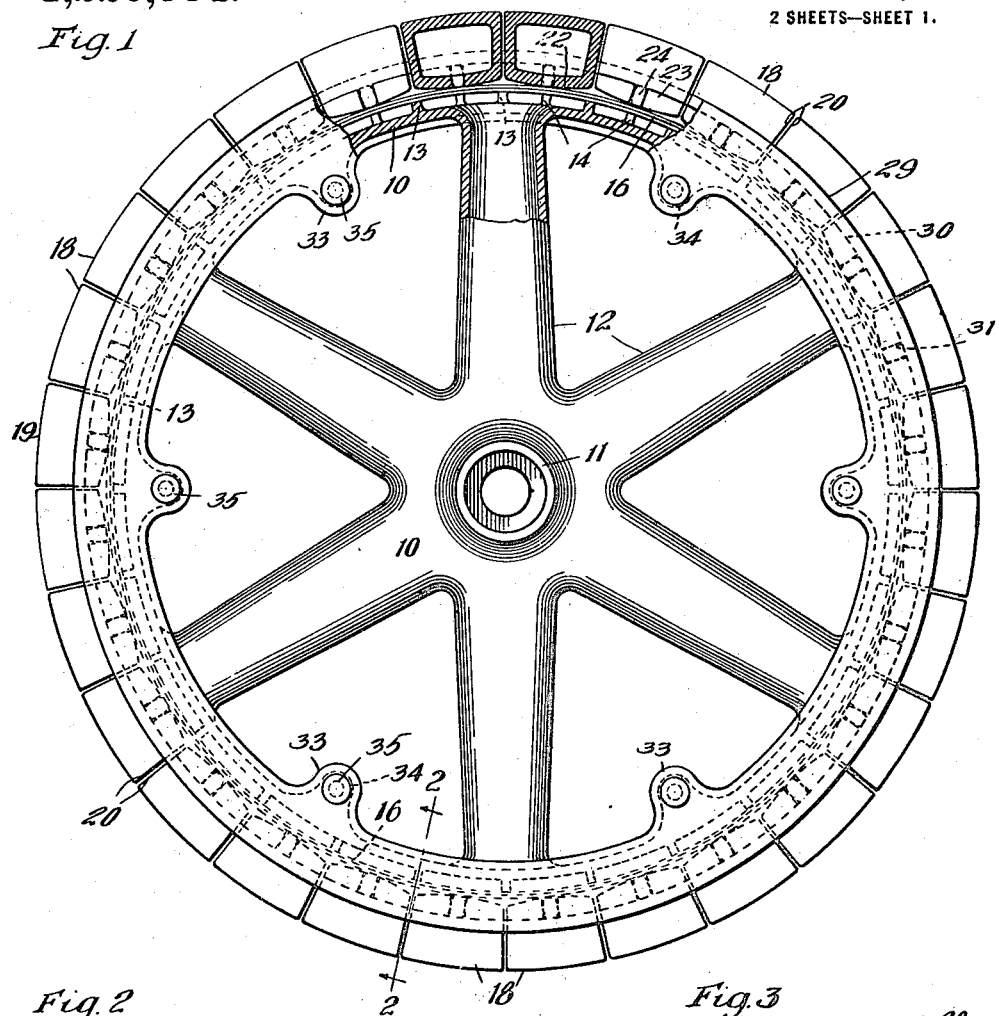
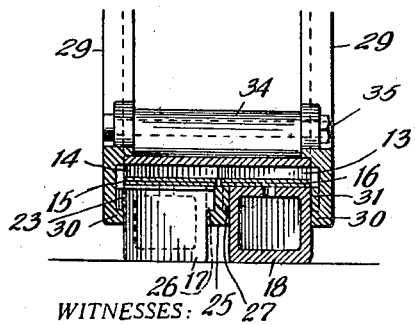
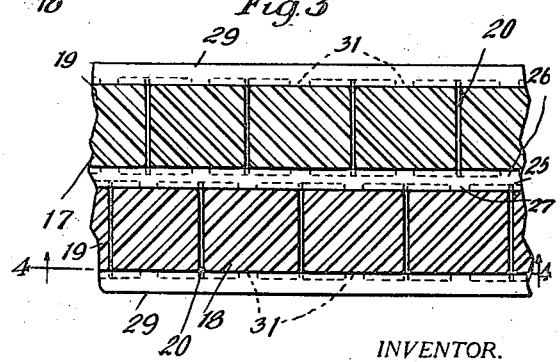
INVENTOR.
John F. O'Connor
BY
ATTORNEY J. F. O'CONNOR.
RESILIENT VEHICLE WHEEL.
APPLICATION FILED JUNE 10, 1915.
1,220,534.
Patented Mar. 27, 1917.
2 SHEETS—SHEET 2.
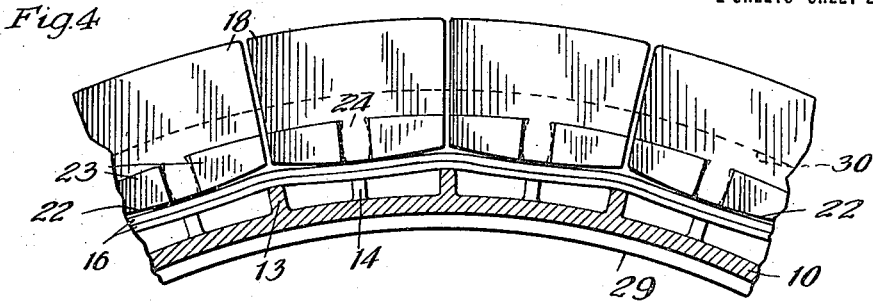
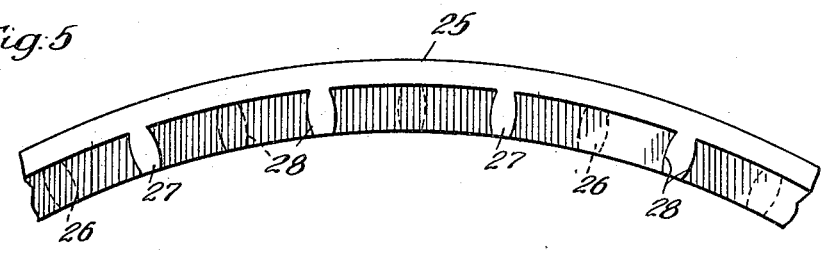
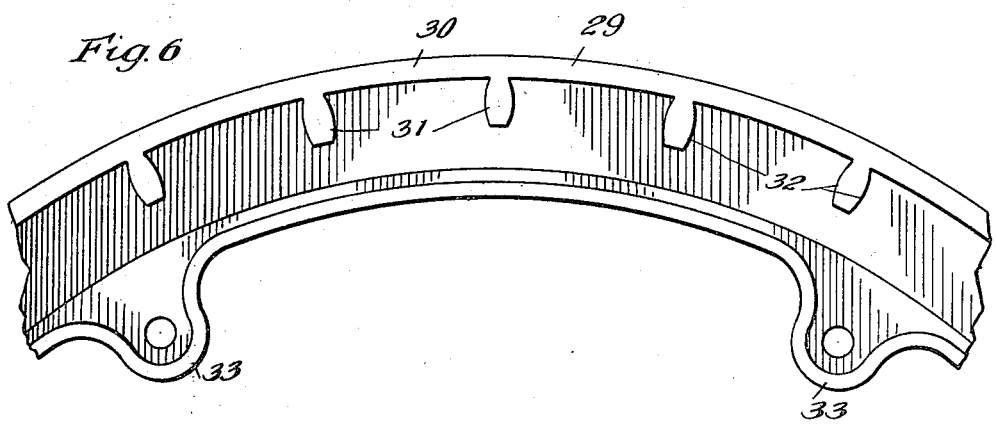
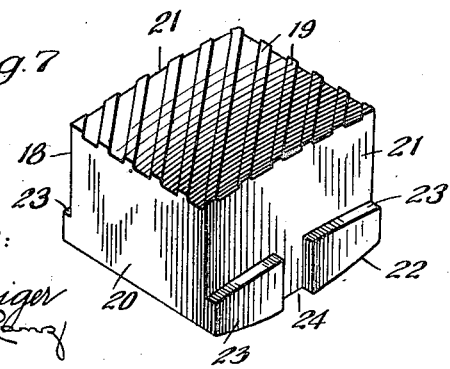
WITNESSES:
INVENTOR.
John F. O'Connor
BY
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

RESILIENT VEHICLE-WHEEL.

1,220,534. Specification of Letters Patent. Patented Mar. 27, 1917.

Application filed June 10, 1915. Serial No. 33,278.

*To all whom it may concern:*

Be it known that I, JOHN F. O'CONNOR, a citizen of the United States, residing at Chicago, in the county of Cook and State of Illinois, have invented a certain new and useful Improvement in Resilient Vehicle-Wheels, of which the following is a full, clear, concise, and exact description, reference being had to the accompanying drawings, forming a part of this specification.

This invention relates to improvements in resilient vehicle wheels.

The object of the invention is to provide a resilient wheel of efficient and durable construction which eliminates any pneumatic cushioning means and which is more particularly adapted for use on heavy trucks.

In the drawing forming a part of this specification, Figure 1 is a side elevation of a wheel showing my improvement in connection therewith, parts being broken away to more clearly illustrate the construction. Fig. 2 is a detail transverse sectional view taken on the line 2—2 of Fig. 1. Fig. 3 is a plan view showing more particularly the tread surface of the wheel. Fig. 4 is a sectional view of the rim portion of the wheel the section being on a plane perpendicular to the axis of the wheel and substantially on the line 4—4 of Fig. 3. Figs. 5 and 6 are side elevations of portions of a spacing ring and a clamping ring, respectively, employed with my improvement. And Fig. 7 is a perspective view of one of the tread blocks.

In said drawing, 10 denotes the main body portion of the wheel having a hub 11 and spokes 12, said member being in the form of a casting, as shown. The wheel 10 around its circumference is provided with two series of radially extending ribs 13 and 14, said series of ribs being staggered or alternated, one series being at one side of the center of the rim and the other series on the opposite side thereof. Encircling each series of ribs 13 and 14 and supported thereon are springs 15 and 16, each of said springs 15 and 16 preferably comprising two bands of spring steel. Mounted on the springs 15 and 16 are two series of tread blocks 17 and 18, each of the blocks 17 and 18 having an outer ribbed or corrugated wearing surface 19, radially arranged end faces 20—20, parallel side walls 21—21 and a convex inner surface 22 which bears upon the adjacent spring 15 or 16. As clearly appears from Fig. 4, each tread block is mounted on its corresponding spring intermediate a pair of ribs by which said spring is supported. Each of the blocks 17 and 18 is provided on its sides with an offset or shoulder 23, slotted or cut away as indicated at 24 at the center. As clearly shown in Fig. 2, said tread blocks 17 and 18 are preferably hollow or cored and, in actual practice, will be made in the form of malleable iron castings. To hold the blocks 17 and 18 in position around the wheel rim I provide a centrally located spacing and retaining ring 25, which is of substantially T shape in cross section. (See Fig. 2.) Said ring on its opposite sides is provided with two series of shoulders 26 and 27, said series being staggered or alternated as clearly shown in Fig. 5. Each of said shoulders 26 and 27 is provided with oppositely arranged convex surfaces 28—28, and are adapted to fit within the slots 24 on the inner opposed faces of the blocks 17 and 18 when the latter are in assembled position. Side clamping rings 29 are also provided, each of which is provided with an outer peripheral rib 30 adapted to engage the shoulders 23 on the outer faces of the blocks 17 and 18 and thereby retain the same in position. Each of the rings 29 is also provided with a series of equally spaced shoulders 31 on its inner face, each of said shoulders 31 having also convex faces 32—32 and adapted to seat in the slots 24 formed on the outer faces of the blocks 17 and 18. The rings 29 are also provided with a plurality of inwardly extending perforated ears 33 arranged to aline with offsets 34 on the inner face of the rim of the wheel 10, the rings 29 being secured to the wheel by bolts 35 passing through the ears 33 and said offsets 34, as will be understood. In assembling the parts, the springs 15 and 16 are first applied, then the inner spacing ring 25, then the two series of blocks 17 and 18, and finally the clamping and retaining rings 29—29. In operation, it is apparent that the blocks 17 and 18 are each independently movable and are so positioned on their corresponding spring 15 or 16 that they will yield radially of the wheel and on account of their convex inner surfaces 22 will rock to a slight extent, there being a small amount of clearance between each of the blocks of each series. The rocking movement of the blocks is possible because of the form and shape of the shoulders 27 and 31 formed on the rings 25 and 29.

From the preceding description, it will be seen that the resilient wheel which I have provided is extremely strong and durable, may be cheaply manufactured, will accommodate itself to the varying conditions of the road bed, avoids the use of pneumatic cushioning means and presents a metal tread surface which thereby increases the life of the wheel.

I claim:

1. In a device of the character described, the combination with a wheel having a rim, said rim being provided with a series of radially extending short ribs around the periphery thereof, a circular band spring extending around said rim and supported on said ribs, of a plurality of independently movable metal tread blocks mounted on said spring, each of said blocks having a curved inner surface bearing on said spring, the number of said blocks corresponding to the number of said ribs, each block being mounted on said spring intermediate adjacent pairs of said ribs whereby inward radial pressure on a block will flex the spring between a pair of said ribs, and means for retaining said blocks in position, the blocks being movable radially and independently of said means.

2. In a device of the character described, the combination with a wheel the rim of which is provided with two series of radially arranged ribs, the ribs of one series being staggered with respect to those of the other series, of band springs extending around the rim of said wheel and supported on said ribs, two series of tread blocks mounted on said springs, the blocks of one series being staggered with respect to the blocks of the other series, each of said blocks having an inner convex surface bearing on the adjacent spring and means for retaining said blocks and springs in position.

3. In a device of the character described, the combination with a wheel the rim of which is provided with two series of radially arranged ribs, the ribs of one series being staggered with respect to those of the other series, of band springs extending around the rim of said wheel and supported on said ribs, two series of tread blocks mounted on said springs, the blocks of one series being staggered with respect to the blocks of the other series, each of said blocks having an inner convex surface bearing on the adjacent spring and means for retaining said blocks and springs in position, said blocks being each independently radially movable and rockably mounted.

In witness that I claim the foregoing I have hereunto subscribed my name this 4th day of June, 1915.

JOHN F. O'CONNOR.

Copies of this patent may be obtained for five cents each, by addressing the "Commissioner of Patents, Washington, D. C."